US010611385B2

(12) United States Patent
Forrer

(10) Patent No.: US 10,611,385 B2
(45) Date of Patent: Apr. 7, 2020

(54) RAIL VEHICLE, METHOD FOR DRIVING A RAIL VEHICLE AND METHOD FOR PRODUCING A RAIL VEHICLE

(71) Applicant: STADLER RAIL AG, Bussnang (CH)

(72) Inventor: Daniel Forrer, Bronschhofen (CH)

(73) Assignee: STADLER RAIL AG, Bussnang (CH)

( * ) Notice: Subject to any disclaimer, the term of this patent is extended or adjusted under 35 U.S.C. 154(b) by 366 days.

(21) Appl. No.: 15/554,068

(22) PCT Filed: Feb. 29, 2016

(86) PCT No.: PCT/EP2016/054199
§ 371 (c)(1),
(2) Date: Aug. 28, 2017

(87) PCT Pub. No.: WO2016/139167
PCT Pub. Date: Sep. 9, 2016

(65) Prior Publication Data
US 2018/0065645 A1   Mar. 8, 2018

(30) Foreign Application Priority Data

Mar. 5, 2015 (EP) .................................... 15157777
Oct. 1, 2015 (EP) .................................... 15187957

(51) Int. Cl.
*B61C 17/06* (2006.01)
*B61C 3/02* (2006.01)
(Continued)

(52) U.S. Cl.
CPC .............. *B61C 17/06* (2013.01); *B60L 3/003* (2013.01); *B61C 3/02* (2013.01); *B61D 1/06* (2013.01);
(Continued)

(58) Field of Classification Search
CPC .. B61C 17/06; B61C 3/02; B61D 3/02; B61D 1/06; B60L 3/003; H02P 5/74
See application file for complete search history.

(56) References Cited

U.S. PATENT DOCUMENTS 9,387,863 B2 *   7/2016   Luebben ................... B60L 5/22
2013/0167752 A1*  7/2013   Barbee ...................... B60L 7/24
                                                        105/1.4
(Continued)

FOREIGN PATENT DOCUMENTS

DE    10 2011 082 516 A1    3/2013
EP         1 024 070 A1    8/2000
(Continued)

OTHER PUBLICATIONS

International Search Report Corresponding to PCT/EP2016/054199 dated Jun. 2, 2016.
(Continued)

*Primary Examiner* — Jason C Smith
(74) *Attorney, Agent, or Firm* — Davis & Bujold PLLC; Michael J. Bujold

(57) ABSTRACT

A rail vehicle (1), a method of producing and method of driving the rail vehicle (1) which comprises at least one car body (2). The car body (2) comprises two car body ends (3, 4) the end region of which is supported on a respective wheel unit (5, 6). At least one wheel unit (5, 6) is designed to be driven. The rail vehicle comprises a drive arrangement comprising a transformer unit (7), a traction motor unit (9) and a power converter unit (8). The primary transformer unit (7) and primary power converter unit (8) are arranged adjacent the first wheel unit (5). The primary transformer unit (7) and the primary power converter unit (8) are connected to the second wheel unit (6) such that a traction motor unit (9), of the second wheel unit (6), can be driven
(Continued)

Figure 1:
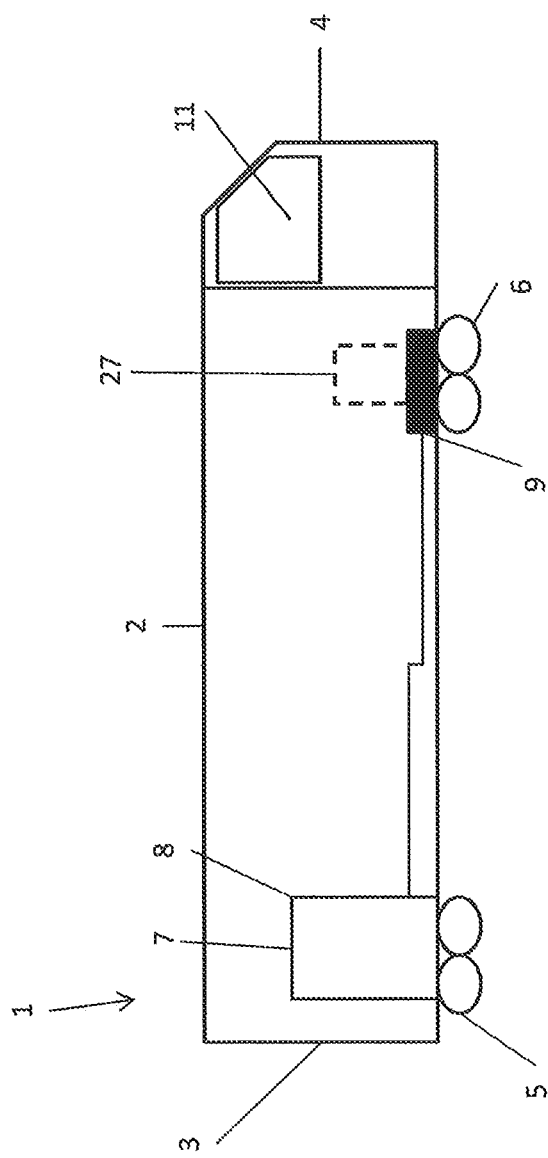

by the primary transformer unit and the primary power converter unit.

9 Claims, 7 Drawing Sheets

(51) Int. Cl.
    *B61D 1/06*           (2006.01)
    *B61D 3/02*           (2006.01)
    *B60L 3/00*           (2019.01)
    *H02P 5/74*           (2006.01)

(52) U.S. Cl.
    CPC ............... *B61D 3/02* (2013.01); *H02P 5/74* (2013.01); *B60L 2200/26* (2013.01); *B60L 2210/00* (2013.01); *B60L 2220/42* (2013.01); *Y02T 30/12* (2013.01); *Y02T 30/18* (2013.01)

(56) References Cited

U.S. PATENT DOCUMENTS

| | | | | |
|---|---|---|---|---|
| 2015/0027339 | A1* | 1/2015 | Lamba | B61C 7/04 |
| | | | | 105/35 |
| 2015/0367736 | A1* | 12/2015 | Salomonsen | B60L 50/50 |
| | | | | 105/35 |
| 2016/0236693 | A1* | 8/2016 | Hawkins | B61C 17/06 |
| 2016/0304000 | A1* | 10/2016 | Barlini | B60M 7/003 |
| 2016/0347204 | A1* | 12/2016 | Takigawa | B61L 3/006 |
| 2017/0203774 | A1* | 7/2017 | Ikemoto | B61F 1/08 |
| 2018/0065645 | A1* | 3/2018 | Forrer | B61C 3/02 |
| 2018/0237037 | A1* | 8/2018 | Shooter | B61F 1/00 |
| 2018/0251138 | A1* | 9/2018 | Debost | B60L 5/00 |
| 2018/0281821 | A1* | 10/2018 | Spenk | B61C 7/04 |
| 2018/0281822 | A1* | 10/2018 | Cardin | B61B 1/00 |
| 2018/0306159 | A1* | 10/2018 | Gotmalm | B61C 15/00 |
| 2018/0334177 | A1* | 11/2018 | Myers | B60L 50/10 |

FOREIGN PATENT DOCUMENTS

| | | |
|---|---|---|
| EP | 1 963 157 A1 | 9/2008 |
| EP | 2 189 320 A1 | 5/2010 |
| WO | 2004/035366 A2 | 4/2004 |
| WO | 2013/160135 A2 | 10/2013 |

OTHER PUBLICATIONS

Written Opinion Corresponding to PCT/EP2016/054199 dated Jun. 2, 2016.

* cited by examiner

RAIL VEHICLE, METHOD FOR DRIVING A RAIL VEHICLE AND METHOD FOR PRODUCING A RAIL VEHICLE

The invention relates to a rail vehicle, to a method for driving a rail vehicle and to a method for producing a rail vehicle according to the preamble of the independent claims.

It is known with rail vehicles to drive wheel units by way of driving devices, while components of the driving devices are arranged distributed in the car body or above the car body.

From WO 2004/035366 for example a car body with a central transformer for a plurality of wheel units is known. Furthermore, double-decker multiple units with two transformers at one car end and two power converters at the other car end are known. Furthermore, the power converter modules can also be provided in the roof space.

From EP 1 963 157 a driving device is known, in which the transformer and the power converter are arranged above a first wheel unit and a second transformer and a second power converter above a second wheel unit.

Disadvantageous with the known rail vehicles on the one hand is a high axle load at high power and an uneven weight distribution at lower power and, in particular upon arrangement of heavy equipment such as transformers or power converters in the roof of traction units, a lack of cross wind stability.

It is therefore the object of the present invention to create a rail vehicle, a method for driving a rail vehicle and a method for producing a rail vehicle, which avoids the disadvantages of the prior art and in particular to create a rail vehicle, in the method for driving a rail vehicle and a method for producing a rail vehicle, which have as balanced as possible a weight distribution with modular producability and the demanded cross wind stability at low power.

The object is solved by a rail vehicle, a method for driving a rail vehicle and a method for producing a rail vehicle according to the independent claims.

The object is solved, in particular, by a rail vehicle which comprises at least one car body. The car body has two car body ends and in the region of the car body ends the car body is supported on a wheel unit in each case. At least one wheel unit is driveably designed. The rail vehicle, furthermore, comprises a drive arrangement wherein the drive arrangement comprises at least one transformer unit, at least one traction motor unit and at least one power converter unit. A primary transformer unit and a primary power converter unit are arranged in the region of the first wheel unit. The primary transformer unit and the primary power converter unit are connected to the second wheel unit in such a manner that the primary traction motor unit of the second wheel unit is driveable by the primary transformer unit and by the primary power converter unit.

Alternatively, a primary transformer unit is arranged in the region of the first wheel unit. The primary transformer unit is connected to a primary power converter unit, arranged in the region of the second wheel unit, and a primary traction motor unit, arranged in the region of the second wheel unit, in such a manner that the primary traction motor unit in the region of the second wheel unit is driveable by the primary transformer unit in the region of the first wheel unit and by the primary power converter unit in the region of the second wheel unit.

Such a rail vehicle has an optimized weight distribution since traction motor unit and transformer unit as well as power converter unit are separated from one another. Furthermore, the center of gravity of the driven wheel unit is very low, which is advantageous, as soon as it concerns a multiple unit and an optimized cross wind stability is demanded.

Such a rail vehicle has an optimized weight distribution since traction motor unit and power converter unit are spatially separated from the transformer unit. Furthermore, the center of gravity of the driven wheel unit is very low, which is advantageous, as soon as it concerns a multiple unit and an optimized cross wind stability is demanded.

The transformer unit according to the invention can be replaced in a direct current supply (DC) by a choke unit.

A traction motor unit according to the invention can comprise one or more motors, preferably a traction motor unit comprises two traction motors.

In particular, the power converter unit is connected to the traction motor unit via a cable device, which bridges the distance between the first and the second wheel unit. The cable device can be formed as a preassembled unit. Preferably, the cable device is a three-phase cable. Furthermore, the power converter unit is also preferably connected to the transformer unit with a further cable device.

In particular, the power converter unit is alternatively connected to the transformer unit via a cable device, which bridges the distance between the first and the second wheel unit. The cable device can be designed as a preassembled unit. Preferably, the cable device is a three-phase cable. Furthermore, the power converter unit is also preferably connected to the traction motor unit with a further cable device. The cable device between traction motor unit and power converter unit is short by way of the spatial arrangement of the two components.

A wheel unit can either be a conventional bogie or a Jacobs-type bogie.

The rail vehicle can comprise a longitudinal axis and a primary transformer unit can be arranged on a first side of the longitudinal axis and the primary power converter unit can be arranged on a second side of the longitudinal axis.

Thus, a substantially even weight distribution on both sides of the longitudinal axis can be achieved.

The car body at a second car body end can comprise a driver's cab and the second wheel unit can be arranged in the region of the second car body end.

Since a driver's cab is very heavy, as balanced as possible a weight distribution is possible by arranging driver's cab and traction motor unit on the second side and transformer unit and power converter unit on the other side of the car body unit.

Alternatively, the driver's cab can be arranged at a first car body end and the first wheel unit can be arranged in the region of the first car body end.

Since in particular the electronic systems in the driver's cab such as for example the train control systems are susceptible to interference currents, it is advantageous to arrange driver's cab and traction motor unit as far away from one another as possible. Consequently, it is possible with the present design to flexibly consider the individual requirements such as cross wind stability and interference current susceptibility and thus to place the driver's cab optimally.

A secondary power converter unit and a secondary transformer unit can be arranged in the region of the second wheel unit.

A secondary power converter and a secondary transformer lead to higher power of the rail vehicle. The arrangement in the region of the second wheel unit makes possible as balanced as possible a weight distribution. Furthermore, the rail vehicle is modularly producible and has as even as possible a weight distribution in both versions, with one drive unit or with two drive units.

Alternatively, a secondary power converter unit can be arranged in the region of the first wheel unit and a secondary transformer unit can be arranged in the region of the second wheel unit.

A secondary power converter and a secondary transformer lead to higher power of the rail vehicle. The arrangement distributed over the first and second wheel unit makes possible as balanced as possible a weight distribution. Furthermore, the rail vehicle is modularly producible and has as even as possible a weight distribution in both versions, with one drive unit or with two drive units.

The term secondary in terms of this application does not mean any weighting relative to the term primary, but exclusively serves for the distinction. Secondary power converter or secondary transformer can correspond to the primary power converter or the primary transformer or have more or less power. Secondary, furthermore, means that a second power converter or transformer or traction motor is formed on a car body. Secondary does not exclusively relate to a wheel unit.

The secondary power converter and the secondary transformer can drive a secondary traction motor unit in the region of the first wheel unit.

Thus, as even as possible a weight distribution over the car body can be achieved.

The car body can be designed as double-decker car body.

In particular with double-decker cars, the axle loads and the cross wind stability are always critical so that the even weight distribution by arranging the drive units in particular in a double-decker car takes effect.

The drive arrangement can comprise an energy storage unit, in particular in the case of direct current supply or in the case of a diesel engine as energy source.

Since an energy storage unit is also relatively heavy, the arrangement of the energy storage unit is adapted to the circumstances in the car body.

An energy storage unit leads to the possibility of recovering and storing braking energy and thus to an economical operating mode of the rail vehicle.

Furthermore, a method for driving a rail vehicle, in particular as described above, which comprises a car body with two car body ends, leads to the solution of the object. In the region of the car body ends a wheel unit is arranged in each case. A primary traction motor unit of a second wheel unit at a second car body end is supplied with energy by a primary power converter unit and a primary transformer unit at a first car body end in the region of the first wheel unit.

Such an energy supply leads to as even as possible a distribution of the axle loads in the rail vehicle.

Alternatively, a primary traction motor unit of a second wheel unit on a second car body end is supplied with energy by a primary power converter unit in the region of the second wheel unit and a primary transformer unit at a first car body end in the region of the first wheel unit.

Such an arrangement leads to an optimized weight distribution, wherein the cable length between power converter and traction motor is optimized.

A secondary traction motor unit of a first wheel unit at a first car body end can be supplied with energy by a secondary power converter unit and a secondary transformer unit at the second car body end.

Alternatively, a secondary traction motor unit in the region of a first wheel unit at a first car body end can be supplied with energy by a secondary power converter unit in the region of the first wheel unit and a secondary transformer unit at the second car body end in the region of the second wheel unit.

Such an arrangement leads to a modular principle, in the case of which in each configuration the axle loads are evenly distributed.

Furthermore, a method for producing a rail vehicle, in particular a rail vehicle as described above, leads to the solution of the object. The method comprises the steps providing a car body with two car body ends, wherein each car body end is supported on a wheel unit, providing a primary power converter unit and a primary transformer unit at a first car body end in the region of the first wheel unit, providing at least one primary traction motor unit on a second wheel unit and second car body end, connecting the primary transformer unit to the primary power converter unit, connecting the primary power converter unit to the at least one primary traction motor unit on the second wheel unit.

Alternatively, the method comprises the steps providing a car body with two car body ends, wherein each car body end is supported on a wheel unit, providing a primary transformer unit at a first car body end in the region of the first wheel unit, providing at least one primary traction motor unit and one primary power converter unit in the region of a second wheel unit and second car body end, connecting the primary transformer unit in the region of the first wheel unit to the primary power converter unit in the region of the second wheel unit, connecting the primary power converter unit to the at least one primary traction motor unit on the second wheel unit.

Preferably, the primary power converter unit is connected to the at least one primary traction motor unit via a three-phase cable.

Such a method makes possible the even distribution of the axle loads in the rail vehicle even during the production.

The method, furthermore, can comprise the steps providing a secondary power converter unit and a secondary transformer unit at a second car body end in the region of the second wheel unit, providing at least one secondary traction motor unit on a first wheel unit at the first car body end, connecting the secondary transformer unit to the secondary power converter unit, connecting the secondary power converter unit to the at least one secondary traction motor unit on the first wheel unit.

Alternatively, the method, furthermore, can comprise the steps providing a secondary transformer unit at the second car body end in the region of the second wheel unit, providing at least one secondary traction motor unit and one secondary power converter unit in the region of the first wheel unit at the first car body end, connecting the secondary transformer unit to the secondary power converter unit, connecting the secondary power converter unit to the at least one secondary traction motor unit in the region of the first wheel unit.

Such a production method makes possible the modular production of a rail vehicle, in which the axle loads are always evenly distributed.

The connections in the production method are created by cables, in particular the connection between power converter unit and traction motor unit by a high-voltage cable. Preferably, the cables between transformer unit and power converter unit or traction motor unit and power converter unit are installed in the lower region of the car body or below the car body.

The method can, furthermore, comprise the step
providing a driver's cab at the second car body end.

Preferably, the power converter unit is spatially assigned further auxiliary equipment, in particular electrical auxiliary equipment such as for example auxiliary operation inverters.

Figure 2:
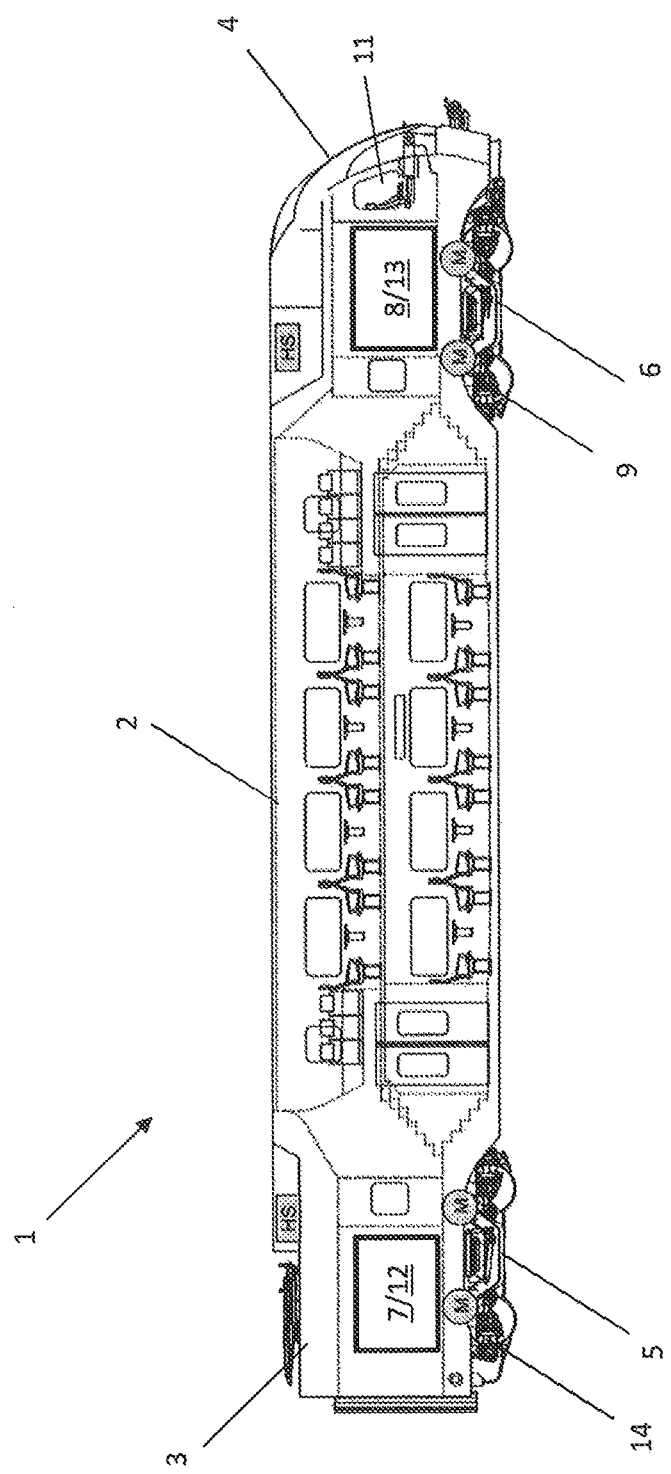
Figure 3:
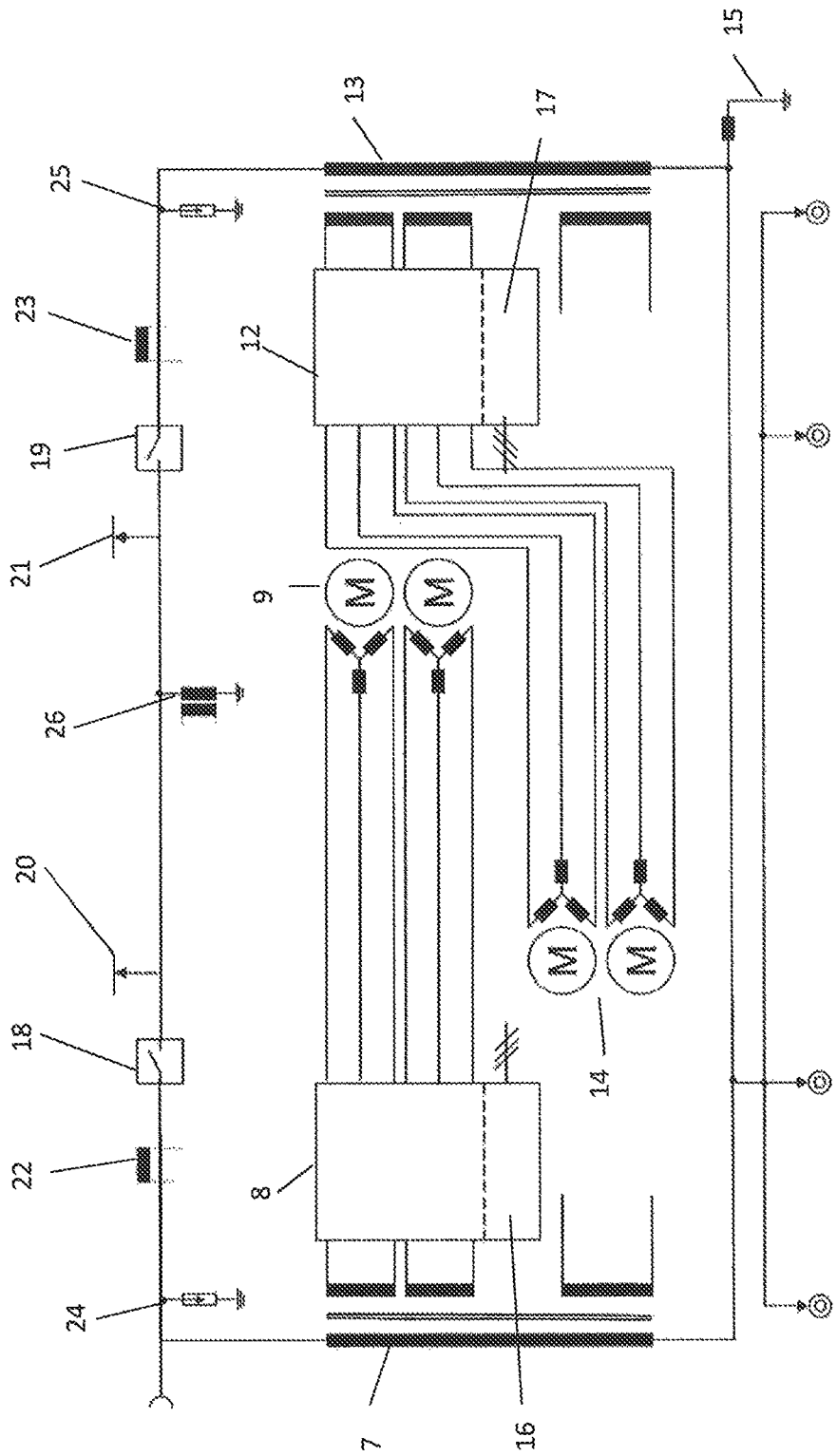
Figure 4:
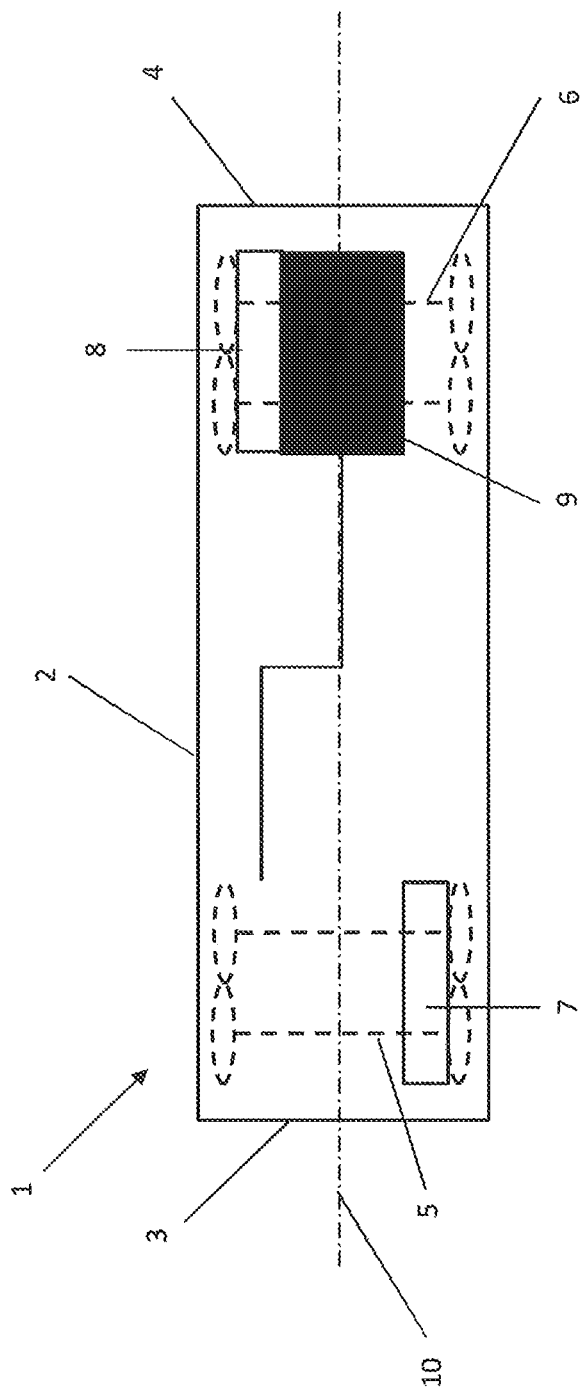
Figure 5:
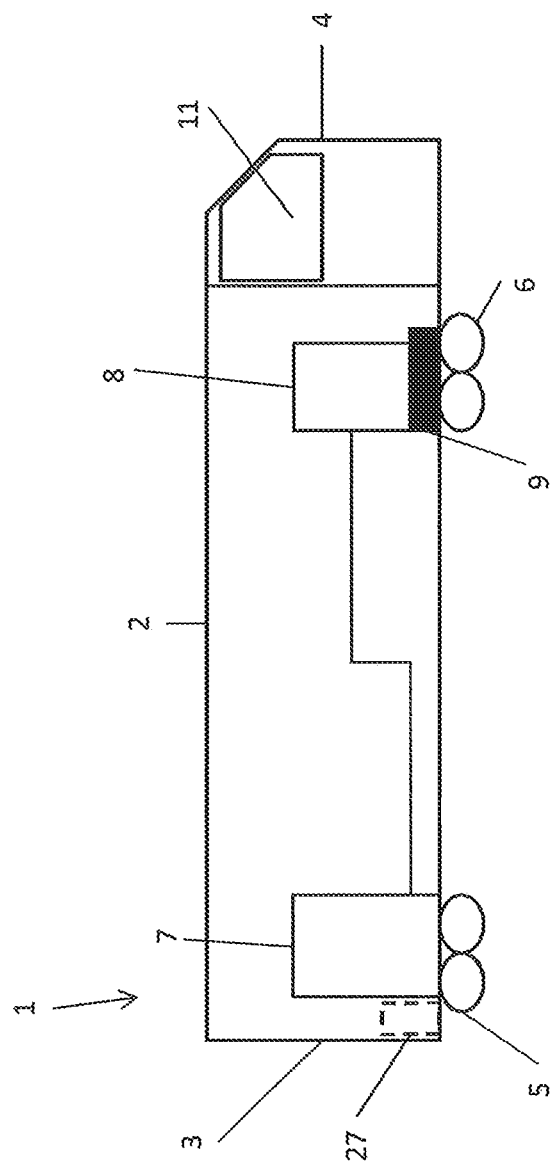
Figure 6:
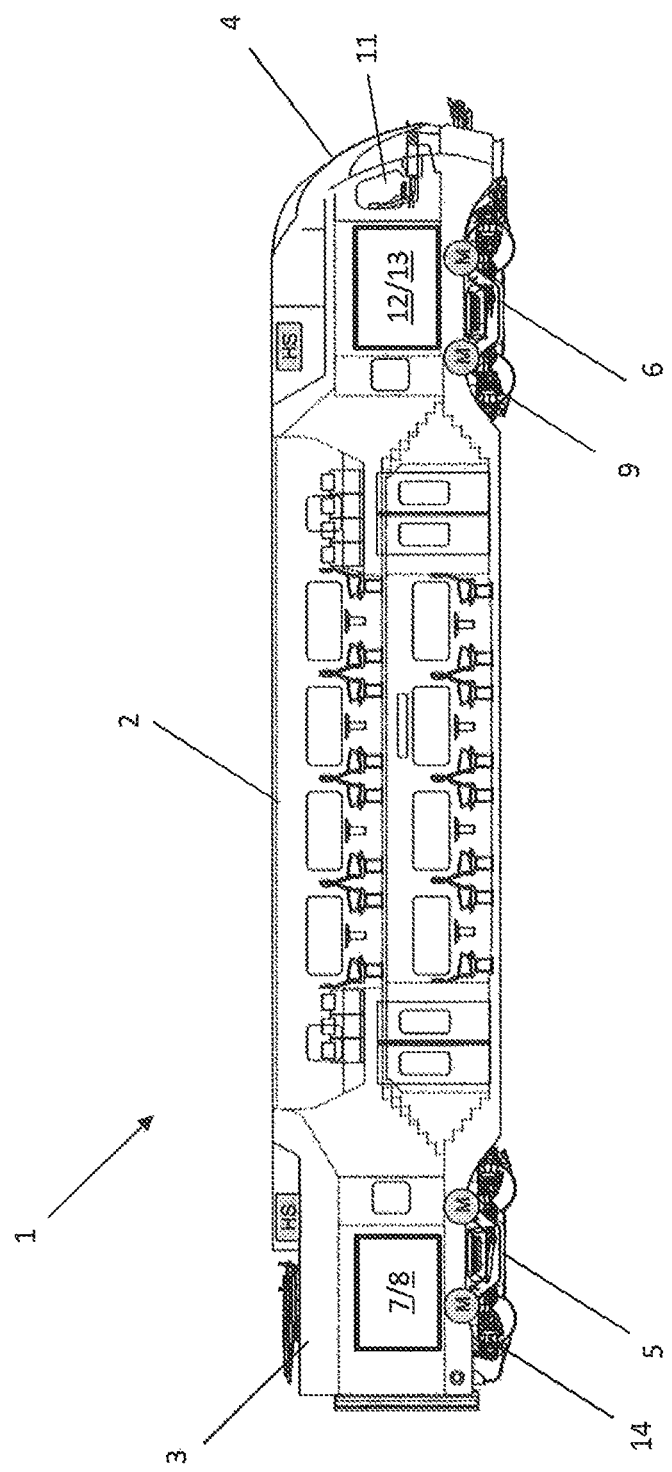
Figure 7:
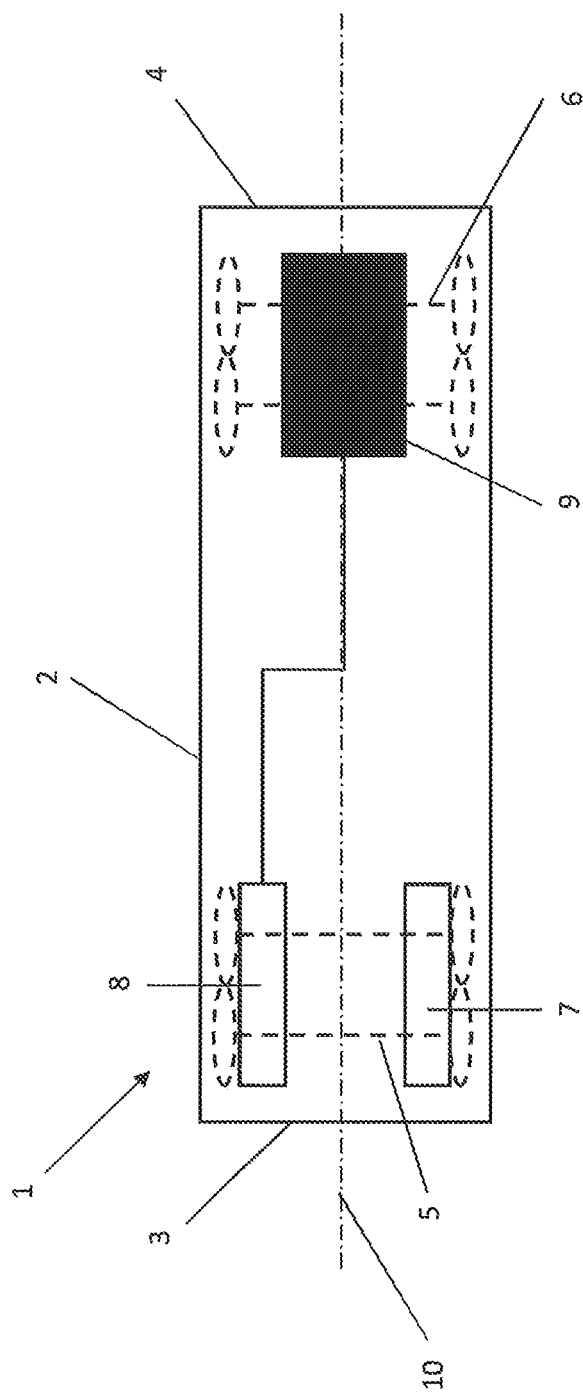

In the following, the invention is explained further by way of exemplary embodiments in figures. There:

FIG. 1: shows a schematic representation of a first embodiment of a rail vehicle, FIG. 2: shows a schematic representation of a second embodiment of a rail vehicle, FIG. 3: shows a detailed circuit diagram of a rail vehicle according to FIG. 2, FIG. 4: shows a schematic representation of a plan view of a third embodiment of a rail vehicle according to the invention, FIG. 5: shows a schematic representation of an alternative embodiment of a rail vehicle, FIG. 6: shows a schematic representation of a second alternative embodiment of a rail vehicle, FIG. 7: shows a schematic representation of a plan view of a third alternative embodiment of a rail vehicle according to the invention.

FIG. 1 shows a schematic representation of a rail vehicle in a first embodiment. The rail vehicle 1 comprises a car body 2 with a first car body end 3 and a second car body end 4. The first car body end 3 is supported on a first wheel unit 5, wherein the second car body end 4 is supported on a second wheel unit 6. In the region of the first wheel unit 5, a primary transformer unit 7 and a primary power converter unit 8 are arranged. The primary power converter unit 8 is connected to the primary traction motor unit 9 via a cable. The primary traction motor unit 9 is arranged in the region of the second wheel unit 6. Optionally, an energy storage 27 in the form of a battery or of a super cap can be arranged in the region of the second wheel unit 6. The second car body end 4 furthermore comprises a driver's cab 11. A driver's cab 11 is usually very heavy so that the same represents a counterweight for the heavy primary transformer unit 7. The car body 2 can be a double-decker or a single-decker car.

FIG. 2 shows a schematic representation of a second embodiment of a rail vehicle 1. The rail vehicle 1 has a car body 2, which comprises a first car body end 3 and a second car body end 4. The car body 2 is designed as double-decker car body. The first car body end 3 is supported on a first wheel unit 5, wherein the second car body end 4 is supported on a second wheel unit 6. The second wheel unit 6 comprises a primary traction motor unit 9, which consists of two traction motors. The primary traction motor unit 9 is supplied with energy by the primary power converter unit 8. The primary power converter unit 8 is therefore connected to the primary traction motor unit 9 with a cable. The cable is advantageously installed in the lower region of the car body 2. The primary power converter unit 8 is additionally connected to the primary transformer unit 7, wherein the primary transformer unit 7 and the primary power converter unit 8 are arranged in the region of the first wheel unit 5. At the second car body end 4, a secondary power converter unit 12 and a secondary transformer unit 13 are arranged in the region of the second wheel unit 6. The secondary power converter unit 12 is connected to the secondary traction motor unit 14 in the region of the first wheel unit 5 via a cable. The car body 2 furthermore comprises a driver's cab 11 at the second car body end 4.

FIG. 3 shows a schematic circuit representation of a rail vehicle 1 according to FIG. 2. A primary transformer unit 7 is connected to a primary power converter unit 8. The primary power converter unit supplies the primary traction motor unit 9 with energy. The primary traction motor unit 9 comprises two traction motors M. The primary power converter unit 8 is additionally assigned a primary auxiliary operation inverter unit 16, and connected to the same via a cable. A secondary power converter unit 12 supplies the secondary traction motor unit 14 with energy. The secondary traction motor unit 14 likewise comprises two traction motors M. The secondary power converter unit 12 is connected to the secondary transformer unit 13. Furthermore, the secondary power converter unit 12 is spatially assigned a secondary auxiliary operation inverter unit 17 and connected to the same via a cable. The energy supply is achieved by the first pantograph 20 and the second pantograph 21. Obviously, one pantograph is also adequate. The first pantograph 20 is assigned a first main switch 18 and a first current measuring transducer 22. In addition, the pantograph 20 is assigned a first overvoltage protector 24. Analogously, the second pantograph 21 is assigned a second main switch 19, a second current measuring transducer 23 and a second overvoltage protector 25. In addition, the power circuit comprises a voltage converter 26 and an earth connection 15.

FIG. 4 shows a schematic representation of a plan view of a further embodiment of a rail vehicle 1 according to the invention. The rail vehicle 1 comprises a car body 2, which at a car body end 3 is supported on a first wheel unit 5 and at a second car body end 4 on a second wheel unit 6. The car body 2 comprises a longitudinal axis 10. A primary transformer unit 7 is arranged in the region of the first wheel unit 5. A primary power converter unit 8 is likewise arranged in the region of the first wheel unit 5. The primary transformer unit 7 is arranged on a side of the longitudinal axis 10 other than the primary power converter unit 8. Thus, the weight is as evenly distributed as possible also in transverse direction. A primary traction motor unit 9 is arranged in the region of the second wheel unit 6 and is supplied with energy from the primary power converter unit 8 via a cable. For the case that the primary traction motor unit 9 comprises two motors, these can also be arranged opposite one another on both sides of the longitudinal axis. Such an embodiment can be easily and modularly expanded by a second drive arrangement analogous to FIG. 2.

FIG. 5 shows a schematic representation of a rail vehicle in a first alternative embodiment. The rail vehicle 1 comprises a car body 2 with a first car body end 3 and a second car body end 4. The first car body end 3 is supported on a first wheel unit 5, wherein the second car body end 4 is supported on a second wheel unit 6. In the region of the first wheel unit 5, a primary transformer unit 7 is arranged. A primary power converter unit 8 is connected to the primary traction motor unit 9 in the region of the second wheel unit 6 via a cable. The primary traction motor unit 9 is arranged in the region of the second wheel unit 6. Optionally, an energy storage 27 in the form of a battery or of a super cap can be arranged in the region of the second wheel unit 6 or the first wheel unit 5. The second car body end 4 furthermore comprises a driver's cab 11. A driver's cab 11 is usually very heavy so that the same represents a counterweight to the heavy primary transformer unit 7. The arrangement of power converter unit 8 and traction motor unit 9 on the side of the driver's cab 11 furthermore optimizes the cross wind stability. The car body 2 can be a double-decker car or a single-decker car.

FIG. 6 shows a schematic representation of a second alternative embodiment of a rail vehicle 1. The rail vehicle 1 has a car body 2 which comprises a first car body end 3 and a second car body end 4. The car body 2 is designed as a double-decker car body. The first car body end 3 is supported on a first wheel unit 5, wherein the second car body end 4 is supported on a second wheel unit 6. The second wheel unit 6 comprises a primary traction motor unit 9 which consists of two traction motors. The primary traction motor unit 9 is supplied with energy by the primary power converter unit 8. The primary power converter unit 8 is therefore connected to the primary traction motor unit 9 with a cable. The primary power converter unit 8 is additionally connected to the primary transformer unit 7, wherein the primary transformer unit 7 and the primary power converter unit 8 are arranged in the region of the first wheel unit 5. At the second car body end 4, a secondary transformer unit 13 is arranged in the region of the second wheel unit 6. The secondary power converter unit 12 is connected to the secondary traction motor unit 14 in the region of the first wheel unit 5 via a cable. The car body 2 furthermore comprises a driver's cab 11 at the second car body end 4.

FIG. 7 shows a schematic representation of a plan view of a further alternative embodiment of a rail vehicle 1 according to the invention. The rail vehicle 1 comprises a car body 2, which at a car body end 3 is supported on a first wheel unit 5 and at a second car body end 4 on a second wheel unit 6. The car body 2 comprises a longitudinal axis 10. A primary transformer unit 7 is arranged in the region of the first wheel unit 5. A primary power converter unit 8 is arranged in the region of the second wheel unit 5. The primary transformer unit 7 is arranged on a side of the longitudinal axis 10 other than the primary power converter unit 8. Thus, the weight is distributed as evenly as possible also in transverse direction. A primary traction motor unit 9 is arranged in the region of the second wheel unit 6 and is supplied with energy from the primary power converter unit 8 via a cable. For the case that the primary traction motor unit 9 comprises two motors, these can also be arranged opposite one another on both sides of the longitudinal axis. Such an embodiment can be easily and modularly expanded by a second drive arrangement analogous to FIG. 6.

The invention claimed is:

1. A rail vehicle comprising:
at least one car body,
wherein the car body has first and second car body ends, a region of the first car body end is supported on a first wheel unit, a region of the second car body end is supported on a second wheel unit, and at least one of the first and the second wheel units is driveably designed,
a drive arrangement comprises at least one transformer unit, at least one traction motor unit and at least one power converter unit and the primary transformer unit is arranged in the region of the first wheel unit,
the primary transformer unit is connected to a primary power converter unit and a primary traction motor unit in a region of the second wheel unit in such a manner that the primary traction motor unit, in the region of the second wheel unit, is driveable by the primary transformer unit in the region of the first wheel unit and by the primary power converter unit in the region of the second wheel unit, or the primary transformer unit and the primary power converter unit are arranged in the region of the first wheel unit, the primary transformer unit and the primary power converter unit are connected to the second wheel unit in such a manner that the primary traction motor unit, in the region of the second wheel unit, is driveable by the primary transformer unit and by the primary power converter unit, and a secondary power converter unit and a secondary transformer unit are arranged in the region of the second wheel unit or the secondary power converter unit is arranged in the region of the first wheel unit and the secondary transformer unit is arranged in the region of the second wheel unit.

2. The rail vehicle according to claim 1, wherein the rail vehicle comprises a longitudinal axis and the primary transformer unit is arranged on a first side of the longitudinal axis and the primary power converter unit is arranged on a second side of the longitudinal axis.

3. The rail vehicle according to claim 1, wherein the car body at a second car body end comprises a driver's cab and the second wheel unit is arranged in the region of the second car body end.

4. The rail vehicle according to claim 1, wherein the secondary power converter unit and the secondary transformer unit drive a secondary traction motor unit of the first wheel unit.

5. The rail vehicle according to claim 1, wherein the car body is designed as double-decker car body.

6. The rail vehicle according to claim 1, wherein the drive arrangement comprises an energy storage unit.

7. A method of driving a rail vehicle, comprising a car body car body having first and second car body ends, a region of the first car body end is supported on a first wheel unit, and a region of the second car body end is supported on a second wheel unit, the method comprising:
supplying a primary traction motor unit of a second wheel unit at the second car body end with energy by a primary power converter unit and a primary transformer unit at the first car body end in the region of the first wheel unit, or supplying a primary traction motor unit in the region of the second wheel unit at the second car body end with energy by the primary power converter unit in the region of the second wheel unit, and a primary transformer unit at the first car body end in the region of the first wheel unit, and
supplying a secondary traction motor unit of a first wheel unit at a first car body end with energy b a secondary power converter unit and a secondary transformer unit at the second car body end, or
supplying a secondary traction motor unit in the region of a first wheel unit at a first car body end with energy by a secondary power converter unit in the region of the first wheel unit and a secondary transformer unit at the second car body end in the region of the second wheel unit.

8. A method of producing a rail vehicle comprising:
providing a car body with first and second car body ends, the first car body end being supported on a first wheel unit and the second car body end being supported on a second wheel unit, and
one of:
providing a primary power converter unit and a primary transformer unit at the first car body end in a region of the first wheel unit,
providing at least one primary traction motor unit on the second wheel unit at the second car body end, connecting the primary transformer unit to the primary power converter unit,
connecting the primary power converter unit to the at least one primary traction motor unit on the second wheel unit,
or,
providing the primary transformer unit at the first car body end in the region of the first wheel unit,
providing at least one primary traction motor unit and one primary power converter unit in the region of the second wheel unit at the second car body end,
connecting the primary transformer unit in the region of the first wheel unit to the primary power converter unit in the region of the second wheel unit,
connecting the primary power converter unit to the at least one primary traction motor unit on the second wheel unit,
providing a secondary power converter unit and a secondary transformer unit at the second car body end in the region of the second wheel unit,
providing at least one secondary traction motor unit on the first wheel unit at the first car body end,
connecting the secondary transformer unit to the secondary power converter unit,
connecting the secondary power converter unit to the at least one secondary traction motor unit on the first wheel unit,
or
providing a secondary transformer unit at a second car body end in the region of the second wheel unit,
providing at least one secondary traction motor unit and one secondary power converter unit on a first wheel unit at the first car body end,
connecting the secondary transformer unit to the secondary power converter unit, and
connecting the secondary power converter unit to the at least one secondary traction motor unit on the first wheel unit.

9. The method according to claim 8, further comprising providing a driver's cab at the second car body end.

* * * * *